United States Patent
Herbst

(10) Patent No.: US 8,313,302 B2
(45) Date of Patent: Nov. 20, 2012

(54) WIND POWER UNIT WITH STRUCTURED SURFACES FOR IMPROVEMENT OF FLOW

(75) Inventor: Manfred Herbst, Nürnberg (DE)

(73) Assignee: Siemens Aktiengesellschaft, München (DE)

(*) Notice: Subject to any disclaimer, the term of this patent is extended or adjusted under 35 U.S.C. 154(b) by 1412 days.

(21) Appl. No.: 10/532,173

(22) PCT Filed: Oct. 21, 2003

(86) PCT No.: PCT/DE03/03505
§ 371 (c)(1),
(2), (4) Date: Mar. 27, 2006

(87) PCT Pub. No.: WO2004/038217
PCT Pub. Date: May 6, 2004

(65) Prior Publication Data
US 2006/0245928 A1    Nov. 2, 2006

(30) Foreign Application Priority Data

Oct. 22, 2002  (DE) .................................. 102 49 297
Jan. 14, 2003  (DE) .................................. 103 01 080

(51) Int. Cl.
*B64C 27/467*    (2006.01)

(52) U.S. Cl. ..................................... 416/235; 416/236 R
(58) Field of Classification Search ................... 415/4.3, 415/4.5, 228, 236 A, 236 R, 235; 416/228, 416/236 A, 236 R, 235; 244/130, 200
See application file for complete search history.

(56) References Cited

U.S. PATENT DOCUMENTS

| | | | |
|---|---|---|---|
| 218,438 A | 8/1879 | Heath | |
| 4,974,633 A | 12/1990 | Hickey | |
| 5,133,516 A * | 7/1992 | Marentic et al. | 244/130 |
| 5,386,146 A | 1/1995 | Hickey | |
| 5,846,141 A | 12/1998 | Morgan et al. | |
| 6,729,846 B1 * | 5/2004 | Wobben | 416/241 A |
| 6,908,063 B2 * | 6/2005 | Bearman et al. | 244/130 |

FOREIGN PATENT DOCUMENTS

| | | |
|---|---|---|
| DE | 100 00 780 A1 | 8/2000 |
| DE | 299 23 485 U1 | 1/2001 |
| WO | WO 02/064422 A1 | 8/2002 |

* cited by examiner

*Primary Examiner* — Dwayne J White

(57) ABSTRACT

A wind power unit comprising a mast, a rotor with several blades, a nacelle and optionally further components around which there is a flow, is disclosed. The surfaces of the mast and/or the rotor blades and/or the nacelle and/or the further components at least partly comprise recesses for improvement of the flow.

18 Claims, 3 Drawing Sheets

WIND POWER UNIT WITH STRUCTURED SURFACES FOR IMPROVEMENT OF FLOW

CROSS REFERENCE TO RELATED APPLICATION

This application is the US National Stage of International Application No. PCT/DE2003/003505, filed Oct. 21, 2003 and claims the benefit thereof. The International Application claims the benefits of German Patent applications No. 10249297.2 DE filed Oct. 22, 2002, and No. 10301080.7 DE filed Jan. 14, 2003, all of the applications are incorporated by reference herein in their entirety.

FIELD OF THE INVENTION

The invention relates to a wind power unit with a mast, a rotor with several rotor blades, a gondola and optionally further components around which there is a flow.

BACKGROUND OF THE INVENTION

Wind turbines of varying output are already firmly established as one of a number of means for generating power. Developments in recent years have made these wind power units even larger and more efficient.

The area swept by the rotor of the wind power unit can be seen as the area from which energy can be taken from the wind. In practice it is disadvantageous for the various components of the wind power unit, such as the mast, the gondola and the spinner or the shaft of the wind power unit to disturb the air flow within this area. This causes eddies, turbulence and lees, which result in a reduction in the area swept by the rotor and thus a lower energy yield.

It is also disadvantageous if the wind power units behind in the wind direction are negatively affected by the turbulence generated. Because an at least partly disturbed, turbulent air flow acts on these wind power plants, their efficiency is diminished.

A further disadvantage is that the individual rotor blades are exposed to the force or pressure of the air flow, which results in a bending load. As a rotor blade sweeps past the mast of the wind power unit, the load on the rotor blade is relieved for a brief period. There is thus a periodic load change, which is expressed in the form of unwanted vibration. These dynamic effects are propagated over the rotor blade hub, the generator, bearings, shafts, drives, transmission to the mast, so that all the components have to have larger dimensions to ensure the required endurance strength. These precautions mean that the wind power unit costs more.

It is already known from WO 97/04280 that the boundary layer of elements around which there is a flow can be influenced by means of a structured surface but electric or magnetic fields are required for this.

SUMMARY OF THE INVENTION

The invention therefore relates to the problem of creating a wind power unit, which avoids the disadvantages mentioned and with which the flow response is improved.

To resolve this problem according to the invention with a wind power unit of the type mentioned above, the surface of the mast and/or the rotor blades and/or the gondola and/or the further components at least partly comprise recesses to improve flow.

Unlike known wind power units with a smooth surface, the wind power unit according to the invention has recesses or corresponding ridges to improve flow. These recesses influence the air flow, in particular the boundary layer, i.e. the region between the component surface and the undisturbed flow. With smooth surfaces, as used in the prior art, the leading side of the flow element is subject to a laminar incident flow, at which point there is an undisturbed flow. The transition point characterizes the change between laminar and turbulent flow. Behind the transition point the air flow eddies, resulting in a significant increase in flow resistance. With the air power unit according to the invention, with the recesses and ridges on the surface, the transition point is displaced in the flow direction, i.e. eddies form later, so the flow resistance is reduced. The reduced flow resistance means that the wind power unit as a whole tends to vibrate less, so the load on the individual mechanical components is less. A further advantage is that the interaction between the rotor mast and the rotor blade sweeping past is reduced, as a result of which the bending load on the rotor blade is also reduced.

A further advantage of the wind power unit according to the invention is that the air flow in the wake region behind the wind power unit is less disturbed so that wind power units behind it are barely subject to any adverse effect. It is therefore possible to set up a plurality of wind power units in a wind farm at a short distance from each other, so that the energy density of the wind farm area can be increased.

It is favorable that the wind power unit according to the invention is less susceptible to dirt and ice. This effect is due to the increased air speed in the recesses.

The wind power unit according to the invention also has the advantage that noise emissions are reduced compared with conventional units. The resulting noise level and the periodic vibration, which are transmitted from the wind power unit to the ground, are undesirable, as they are experienced as a nuisance by nearby residents. This problem can be remedied with the wind power plant according to the invention, as the adverse effects described are very significantly reduced, resulting in greater acceptance of the technology.

The recesses on the surface of the wind power unit according to the invention can differ in form. It is particularly favorable, if they essentially have the form of a hemisphere.

Similarly configured surfaces are used on golf balls, giving the golf ball better flight characteristics due to aerodynamic effects. The use of hemispheres as recesses is particularly expedient at points which are subject to an incident flow from different directions, e.g. in the case of the rotor masts. It is however also possible to use differently configured recesses, e.g. in the form of a half-teardrop profile. Teardrop profiles are particularly flow-favorable, i.e. they only generate minimal resistance. Teardrop profiles are particularly suitable for the rotor blades, as the direction of the incident flow is essentially constant in the case of rotor blades.

It is advantageous to arrange the recesses regularly on the surface(s). For example the recesses can be arranged in rows, with the option of offsetting adjacent rows in respect of each other. This achieves good surface utilization.

In the case of a rotor blade, the recesses can particularly advantageously be arranged in the region between the transition point between laminar and turbulent flow and the final edge of the rotor blade. With this embodiment the nose region of the rotor blade, around which there is a laminar flow, has no recesses. The recesses are arranged in the region, in which the transition between laminar and turbulent flow takes place in conventional rotor blades. The recesses cause the transition point to be displaced in the flow direction, so that the laminar section of the flow is extended. This effect means that the turbulent region is significantly smaller compared with conventional wind power units.

The invention can be realized particularly easily, if the recesses are configured on a flat support material, which can be fixed on or to the wind power unit. This means that wind power units can also be provided with the surface structure having recesses at a later time. Handling is particularly easy, if the support material is a film, in particular a self-adhesive film.

BRIEF DESCRIPTION OF THE DRAWINGS

Further advantages and details of the invention are described in more detail using exemplary embodiments with reference to the figures. The figures are schematic diagrams, in which.

DETAILED DESCRIPTION OF THE INVENTION

Figure 1:
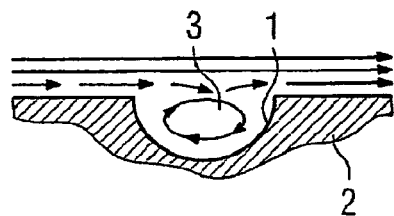
FIG. 1 shows a hemispherical recess in the surface of a wind power unit according to the invention in a sectional side view.

FIG. 1 shows a hemispherical recess 1 in the surface 2 of a wind power unit in a sectional side view. As shown in FIG. 1, the surface 2 is subject to an incident flow essentially parallel to the surface. The hemispherical recess 1 shown in this exemplary embodiment should only be seen as an example. Instead of a hemispherical form, the form of a half-teardrop or another form can be selected, which improves the flow.

As the air sweeps past the recess 1, an eddy 3 forms in the recess 1, which assists the passage of the air and accelerates the air volume. The extent of this effect is a function of the incident flow speed, the angle of incidence, the air pressure, the air temperature, the form and configuration of the recess 1. The eddies 3 forming in each recess act like a "ball bearing" for the passing air. The laminar flow at the surface 2 is not disturbed or is only slightly disturbed as a result.

FIGS. 2-7 show the recess 1 shown in FIG. 1 and the aerodynamic effects as air sweeps past in individual steps.

Figure 2:
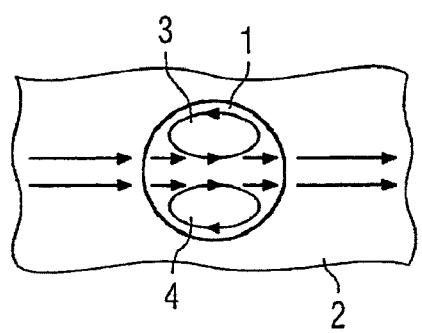
FIGS. 2 to 7 show the recess shown in FIG. 1 and the aerodynamic effects as air sweeps past in individual steps.

FIG. 2 is a top view and represents the surface 2 of a component of the wind power unit, which has a recess 1. The circular edge of the hemispherical recess 1 can be seen in FIG. 2. The recess 1 is subject to an essentially laminar incident flow by the passing air, as a result of which two symmetrical eddies 3, 4 are initially generated.

Figure 3:
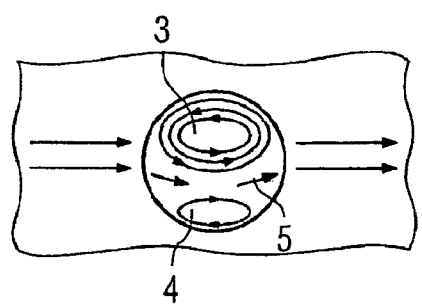

FIG. 3 shows the recess in FIG. 2 a short time later. Due to asymmetries in the incident flow, the dominant eddy has formed in the recess 1, while the other eddy 4 has become weaker. It can also be seen in FIG. 3 that the flow lines 5 of the passing air are deflected laterally between the eddies 3, 4.

Figure 4:
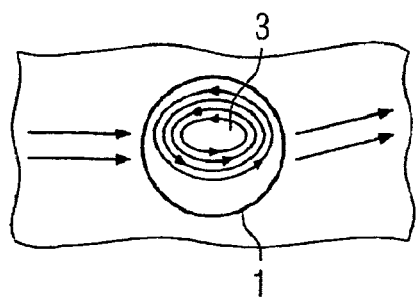

As shown in FIG. 4 the dominant eddy 3 on the one side has become a "tornado". In other words a small, local eddy has occurred, in which the air rises, so that it is moved away from the surface 2. An eddy 3 has therefore formed out of the recess 1, which drives the passing air further in the flow direction. FIG. 4 also shows that the passing air is deflected laterally.

Figure 5:
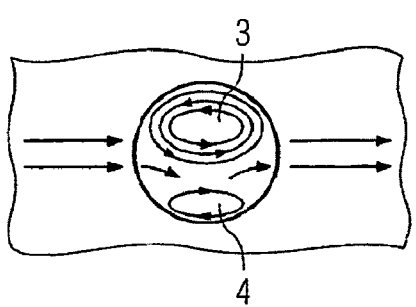

FIG. 5 shows the flow conditions a short time later. The eddy 3 collapses again after a short time due to flow asymmetries, so the strength of the dominant eddy is reduced. At the same time the other eddy 4 starts to extend. Unlike the situation in FIG. 4, in this situation the passing air is not deflected laterally, in other words it is not affected.

Figure 6:
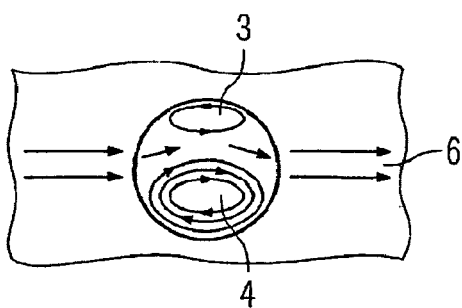

FIG. 6 shows the flow conditions a little later. The eddy 4 starts to dominate, as it is significantly larger and stronger than the other eddy 3. It can also be seen that the flow lines 6 of the passing air are deflected laterally. The eddies 3, 4 have opposing rotation directions, so the flow lines 6 of the passing air are deflected in the opposite lateral direction compared with the situation in FIG. 4, in which the eddy 3 was dominant.

Figure 7:
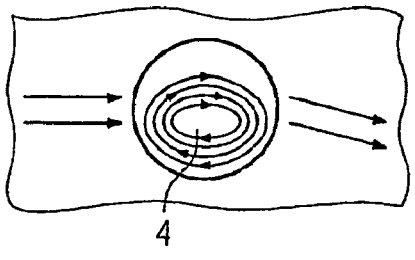

FIG. 7 shows the flow conditions a short time later. The eddy 4, which is counter to the eddy 3, has developed to become a larger eddy, which drives the passing air further out of the recess 1 in the flow direction.

The eddy 4 also goes on to collapse again due to flow asymmetries and the sequence shown is repeated continuously.

Figure 8:
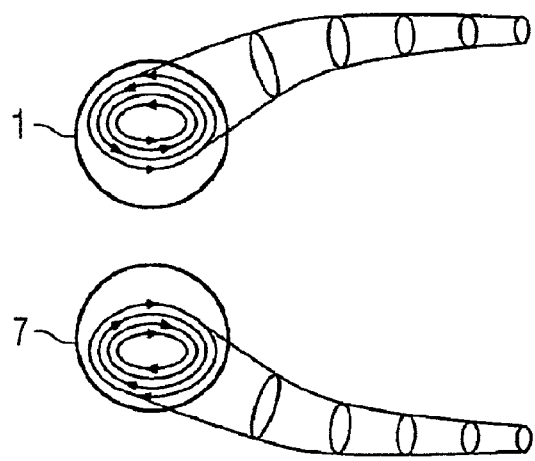
FIG. 8 shows the development of flow eddies at the recesses.

FIG. 8 shows the development of flow eddies at the recesses. The wind power unit generally has a plurality of recesses, which are configured on the surface of the rotor blades, the mast, the gondola or another component around which there is a flow. Small flow eddies form from each individual recess 1 and drive the passing air further in the flow direction. After some time the eddy collapses and an eddy with the opposite rotation direction develops. Adjacent recesses 1, 7 can thereby have the same or opposite rotation directions. The friction resistance in the boundary layer between the passing air and the surface is thereby reduced and the air flow at the surface is also assisted and accelerated. As the overall energy in a closed system cannot increase, energy is consumed at the same time at other points, for example due to friction effects, i.e. the friction energy of conventional systems is partly used to generate the eddies, which in turn reduce overall friction losses.

Figure 9:
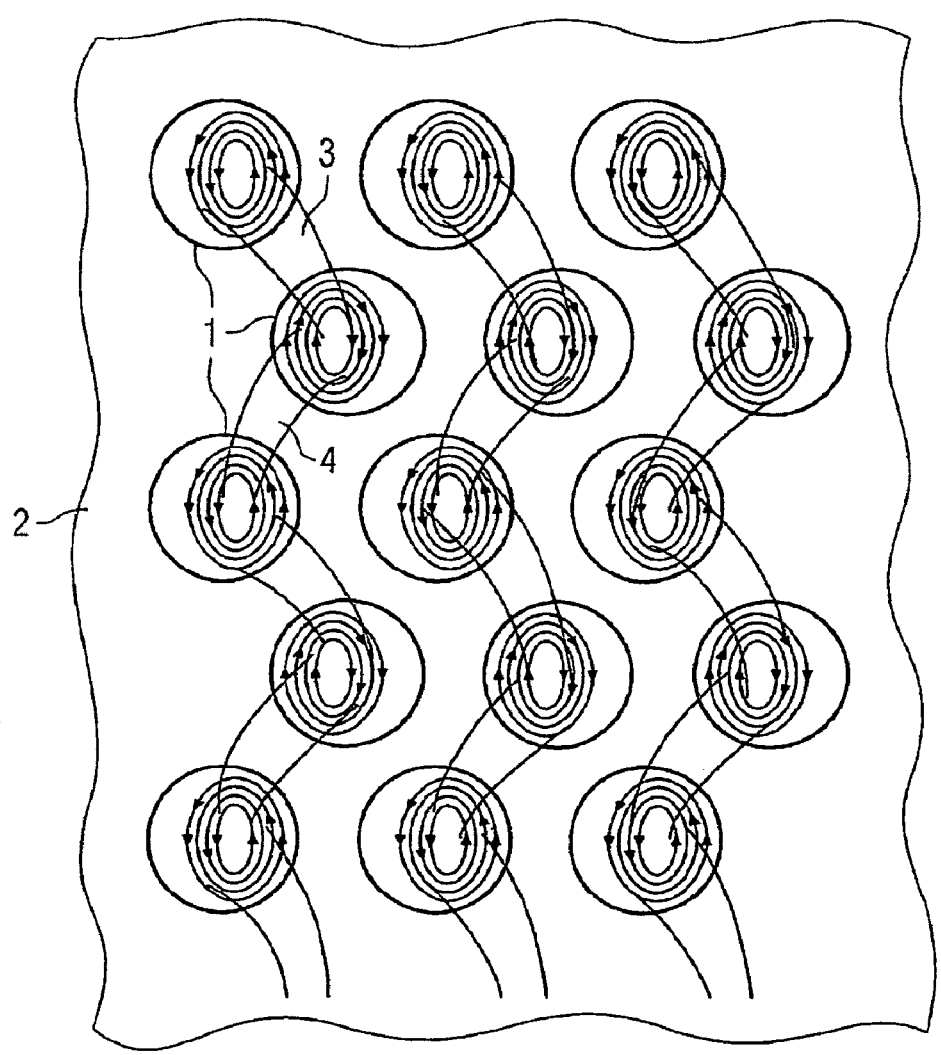
FIG. 9 shows a top view of a field with regularly arranged recesses and the flow pattern thereby produced.

FIG. 9 shows a field with regularly arranged recesses and the resulting flow field. As shown in FIG. 9, the recesses are arranged in horizontal rows, adjacent rows being offset laterally such that each recess 1 is essentially the same distance from all adjacent recesses. The counter-clockwise and clockwise eddies alternate over time and a pattern of these alternating eddies develops on the surface 2 around which there is a flow, said eddies extending essentially from one recess 1 to the next recess 1 as a function of incident flow speed and further aerodynamic parameters. These eddies 3, 4 assist and accelerate the air flow over the entire surface 2.

Figure 10:
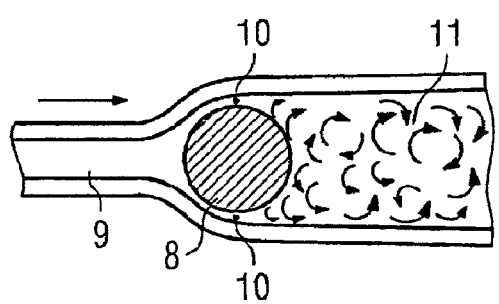
FIG. 10 shows a rotor mast of a conventional wind power unit subject to an incident flow and the flow field produced in a horizontal sectional view.

FIG. 10 shows a schematic diagram of a rotor mast of a conventional wind power unit subject to an incident flow and the turbulence field generated in a horizontal sectional view. The rotor mast 8 has a circular cross-section. The incident air mass 9 is essentially laminar, i.e. the individual flow elements run parallel to each other and the air is turbulence-free. The transition points 9 are located on the left and right sides of the rotor mast viewed in the flow direction in the region of the maximum diameter. The transition point 10 characterizes the point at which the laminar flow 9 changes to a turbulent flow 11. As shown in FIG. 10, the wake region with the turbulent flow is slightly tapered in form so the turbulent region increases behind the wind power unit. Wind power plants behind are subject to the action of turbulent air, which reduces their efficiency.

Figure 11:
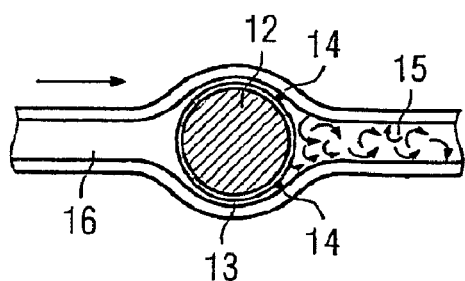
FIG. 11 shows a rotor mast of a wind power unit according to the invention and the flow field produced in a horizontal sectional view.

FIG. 11 is similar to FIG. 10 and shows a rotor mast 12, with a film 13 on the outside, the film 13 having recesses to improve flow. Unlike the rotor mast in FIG. 10, in the case of the rotor mast 12 with film 13 the incident laminar air 16 has a significantly longer laminar section, so the transition points 14 are displaced in the flow direction. As shown in FIG. 11, the transition points are behind the maximum diameter of the rotor mast 12, so that the flow is subject to very low friction levels until then. The turbulent flow 15 can only form after this. Unlike the example shown in FIG. 10, the region of turbulent flow 15 is significantly smaller, so that wind power units behind are influenced significantly less. It is therefore possible to set up individual wind power units in a wind farm at shorter distances from each other, resulting in better surface utilization and a higher energy yield per unit of area.

Figure 12:
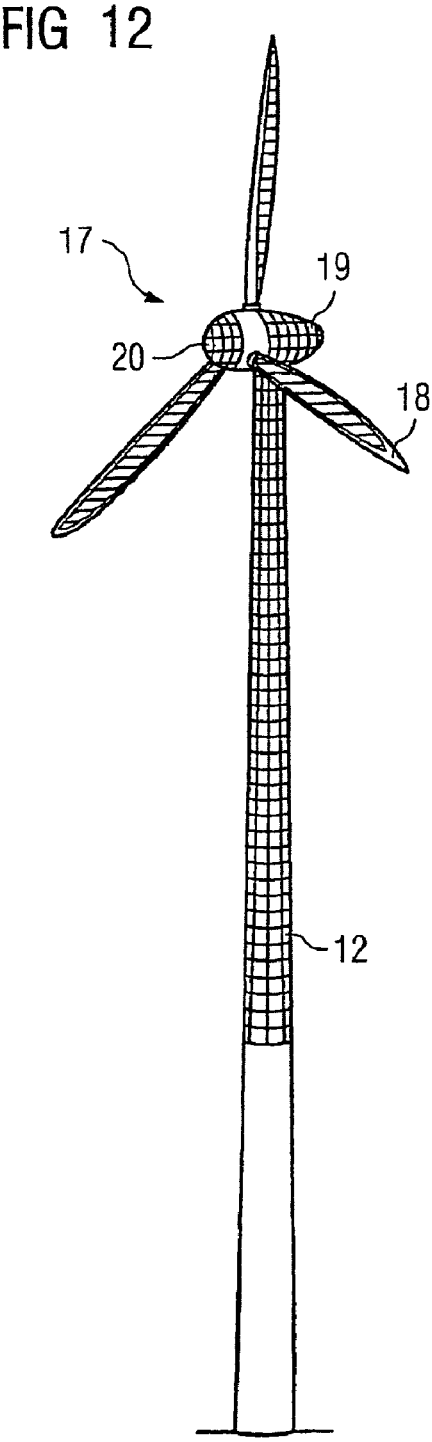
FIG. 12 shows a wind power unit according to the invention, the surface of which at least partly has recesses to improve flow.

FIG. 12 shows a schematic view of a wind power unit, the surface of which at least partly has recesses to improve flow. The wind power unit, referred to as a whole as 17, essentially comprises a mast 12, a rotor with several rotor blades 18, a gondola 19 to accommodate the generator and a spinner 20, which covers the hub region of the rotor.

The regions of the surface of the individual components of the wind power unit 17 which have recesses are shown hatched in FIG. 12. The rotor mast 12 is provided in its entirety, apart from its lower section, with recesses to improve flow. The entire surfaces of the gondola 19 and spinner 20 are also provided with recesses. The rotor blades 18 have strip-shaped regions running longitudinally along their upper and lower sides, which are provided with recesses.

Unlike the known sharkskin effect, with which friction can be reduced by around 10%, first preliminary trials have shown that an improvement of around 30% can be expected with the wind power unit.

The invention claimed is:

1. A wind power unit and a flow field, comprising:
a mast positionable to receive a laminar flow along a path having a direction generally transverse to a direction along which the mast has a variable width, the mast including a maximum width measurable in a direction transverse to the laminar flow;
a nacelle associated with the mast;
a rotor associated with the nacelle;
a plurality of rotor blades, at least one rotor blade having a plurality of recesses each having a shape in accord with the shape of a hemisphere, each recess positioned the same distance from all adjacent recesses, to improve flow arranged on the rotor blades approximately in the region between the transition point between laminar and turbulent flow and the final edge of the rotor blade and the shape and configuration of the recesses are designed such that, as the air sweeps past a recess, alternating flow eddies form in the recess that assist with continued laminar flow of the air while also reducing flow resistance along the surface relative to flow in the absence of the recesses,
the mast characterized by a transition point along the flow path wherein a flow portion: (i) has predominantly laminar characteristics when travelling toward the transition point; and (ii) is characterized by turbulent flow when travelling away from the transition point, and
wherein the transition point is positioned relative to a second point on the mast coinciding with the maximum width such that the flow portion first passes along the second point before passing the transition point.

2. The wind power unit according to claim 1, wherein the recesses are shaped as hemispheres and are also arranged on the mast.

3. The wind power unit according to claim 1, wherein the recesses are arranged in rows configured as an array having design such that, as the air sweeps past the recesses, multiple flow eddies form in multiple ones of the recesses that assist with passage of the air flow with reduced resistance, the array being operatively positioned in a region on the surface along which the air flow passes to cause, in the presence of flowing air, a point along the direction of the air flow at which transition between laminar and turbulent flow occurs under the force of air flow, to be displaced in the direction of the air flow, so that resistance to the air flow is reduced.

4. The wind power unit according to claim 3, wherein the rows are arranged offset with respect to each other.

5. The wind power unit according to claim 1, wherein the recesses are configured on a flat support material, which can be fixed on or to the wind power unit.

6. The wind power unit according to claim 5, wherein the support material is a film.

7. The wind power unit according to claim 1, wherein a structure and profiles of the rotor blades are tailored to a stall speed as modified by the recesses.

8. The wind power unit according to claim 1, wherein control software is tailored to a stall speed as modified by the recesses.

9. The wind power unit according to claim 1, wherein a component surface is not susceptible to dirt and ice.

10. A wind power unit comprising:
a mast;
a nacelle associated with the mast;
a rotor associated with the nacelle; and
a plurality of rotor blades, wherein the mast and rotor each include along a surface thereof a plurality of recesses each having a shape corresponding to that of a countour of a hemisphere, each recess positioned the same distance from all adjacent recesses, wherein the shape and configuration of the recesses are designed such that as the air sweeps past a recess, one or more eddy flows form in the recess that assist the passage of the air at reduced resistance relative to conditions in the absence of the recesses, and wherein a pattern of the alternating flow eddies develop over the surface, extending from one recess to a next recess in the array as a function of air flow speed.

11. The unit and flow field of claim 10 wherein one or more of the rotor blades includes a plurality of recesses shaped as hemispheres each positioned the same distance from all adjacent hemisphere shaped recesses.

12. The unit and flow field of claim 10 wherein the recesses along the mast surface are configured to reduce the region of turbulent flow so that turbulence behind the unit is smaller, having less influence on any wind power machines positioned behind the unit.

13. A wind power unit comprising:
a mast;
a rotor; and
a plurality of rotor blades configured to sweep past the mast when exposed to a force or pressure of air flowing in a direction extending toward and past the blades and mast, wherein the mast or one of the plurality of rotor blades includes along a surface thereof a plurality of recesses each having a shape in accord with at least a sector of a hemisphere, each recess positioned the same distance from all adjacent recesses, the recesses configured as an array of design such that, as the air sweeps past the recesses, flow eddies form in the recesses that assist with the passage of air flow at reduced resistance relative to flow in the absence of such recesses, the array being operatively positioned in a region on the surface along which the air flow passes to cause, in the presence of flowing air, a point along the direction of the air flow at which transition between laminar and turbulent flow occurs under the force of air flow, to be displaced in the direction of the air flow, so that resistance to the air flow is reduced.

14. The wind power unit of claim 13 wherein the provision of recesses with shapes in accord with at least a sector of a hemisphere enables the array to support a pattern of clockwise and counterclockwise flow eddies which alternate over time.

15. The wind power unit of claim 13 wherein, when air flows across the surface, a pattern of the alternating flow eddies develops over the surface, extending from one recess to a next recess in the array as a function of air flow speed.

16. The wind power unit of claim 13 wherein the recesses are each in the shape of a hemisphere.

17. The wind power unit of claim 13 wherein the mast includes a major surface along which the plurality of recesses are formed.

18. The wind power unit of claim 13 wherein a film with the recesses formed therein is positioned on the outside of the mast.

* * * * *